3,291,837
NOVEL BENZOPHENONE ETHERS

Albert I. Goldberg, Berkeley Heights, N.J., and Joseph Fertig, New York, N.Y., assignors to National Starch and Chemical Company, New York, N.Y.
No Drawing. Filed Jan. 4, 1963, Ser. No. 252,659
10 Claims. (Cl. 260—591)

This invention relates to a novel class of benzophenone derivatives, the process for their preparation, as well as the compositions resulting from their admixture with synthetic resins.

The advantageous properties of benzophenone derivatives, as regards their use as light stabilizing additives for various synthetic plastics, have long been recognized by the practitioner. The ultra-violet absorbing ability of these materials has promoted further investigation leading to the synthesis of additional benzophenone compounds displaying this useful characteristic. The prior art does, in fact note the existance of a wide variety of such derivatives. However, the great majority of these compounds are unfortunately prepared by means of procedures which necessitate a multiplicity of operations and this factor, in turn, places definite limitations on their commercial production and subsequent utilization by the plastics industry.

It is thus the prime object of this investigation to provide a novel class of benzophenone derivatives which are prepared by means of a simplified, one-step route that is free of the complexities inherent in the processes which have generally been utilized for preparing benzophenone derivatives. A further object of this invention involves the preparation of novel benzophenone ethers characterized by their excellent ultra-violet absorbing ability. A still further object of our invention is the admixture of our novel benzophenone derivatives with many types of synthetic resins so as to provide the resulting compositions with improved resistance to the degradative effects of ultra-violet radiation. An additional object of our invention is the synthesis of ultra-violet stabilizing benzophenone derivatives which may also be conveniently utilized as chemical intermediates for further conversion into a variety of useful products by means of chemical reactions well known to those skilled in the art. Various other objects and advantages of this invention will become apparent from the following description thereof.

We have now discovered that novel hydroxyhalopropyl benzophenone ethers may be prepared by means of a direct, highly efficient procedure.

The novel derivatives of our invention are the 2-hydroxy-3-halopropyl benzophenone ethers which correspond to the following:

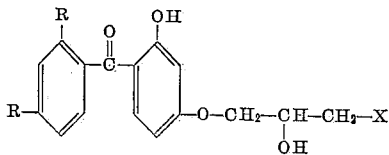

wherein X is a halogeno radical selected from the group consisting of the chloro, iodo and bromo radicals and R is a radical selected from the class consisting of hydrogen and hydroxy radicals.

Thus, these compounds may be described as the 2-hydroxy-3-halopropyl benzophenone ethers of 2,4-dihydroxybenzophenone, 2,2′,4-trihydroxybenzophenone, and 2,2′,4,4′-tetrahydroxybenzophenone wherein said 2-hydroxy-3-halopropyl ether radicals are substituted upon the 4 position of the benzophenone nucleus. In assigning specific names to our novel derivatives, they will be hereinafter referred to a hydroxyhalopropoxy benzophenone ethers. Thus the derivatives coming within the scope of our invention are:

2-hydroxy-4-(2-hydroxy-3-chloropropoxy)benzophenone;
2-hydroxy-4-(2-hydroxy-3-bromopropoxy)benzophenone;
2-hydroxy-4-(2-hydroxy-3-iodopropoxy)benzophenone;
2,2′-dihydroxy-4-(2-hydroxy-3-chloropropoxy)benzophenone;
2,2′-dihydroxy-4-(2-hydroxy-3-bromopropoxy)benzophenone;
2,2′-dihydroxy-4-(2-hydroxy-3-iodopropoxy)benzophenone;
2,2′,4-trihydroxy-4-(2-hydroxy-3-chloropropoxy)benzophenone;
2,2′,4-trihydroxy-4-(2-hydroxy-3-bromopropoxy)benzophenone; and
2,2′,4-trihydroxy-4-(2-hydroxy-3-iodopropoxy)benzophenone.

In brief, the synthesis of our novel derivatives is accomplished by the catalyzed reaction of a benzophenone intermediate together with an epihalohydrin selected from among the group consisting of epichlorohydrin, epiiodohydrin and epibromohydrin. This technique has been found, surprisingly, to produce these derivatives in excellent yields, does not require the use of an organic solvent medium, and is totally devoid of any by-products. As a result, our derivatives may, if desired, be used without any need for their being subjected to any extended series of yield reducing isolation and purification procedures.

The benzophenone intermediates which are applicable for use in preparing the novel derivatives of our invention are compounds corresponding to the following formula:

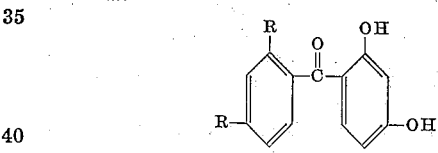

wherein R represents a radical selected from among the class consisting of hydrogen and hydroxy radicals. As examples of such benzophenone intermediates, one may list:

2,4-dihydroxybenzophenone, i.e.

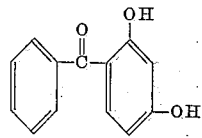

2,2′,4-trihydroxybenzophenone, i.e.

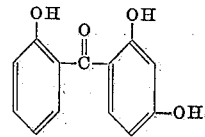

and,
2,2′,4,4′-tetrahydroxybenzophenone, i.e.

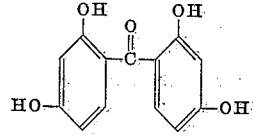

Hereinafter, it is to be understood that the use, in this specification, of the expression, "the benzophenone intermediate" is for purposes of brevity and is meant to include each of the above listed intermediates as well as any others which may correspond to the above noted formula which was given to represent these intermediates. Thus, one may utilize intermediates corresponding to the above formula which have been substituted, as for example with low molecular weight hydrocarbon groups, in preparing the novel derivatives of our invention.

In general, the procedure for preparing our hydroxyhalopropoxy benzophenone ethers begins with the introduction into a reaction vessel of the selected epihalohydrin, the benzophenone intermediate and the catalyst. The latter may be selected from among any member of the group consisting of the alkali metal hydroxides, such as sodium hydroxide or potassium hydroxide; the salts of the alkali metals, such as sodium bicarbonate or potassium chloride; and, the quaternary ammonium halides, such as tetramethylammonium chloride or tetrabutylammonium iodide. These catalysts should be present in a concentration of about 0.1 to 5.0%, as based upon the weight of the epihalohydrin. The concentration of the epihalohydrin in the reaction system may, in turn, range from about a 5 to about a 100% molar excess over the benzophenone intermediate which is being reacted; the higher concentrations of the epihalohydrin being utilized in those cases wherein the latter is also serving as a solvent medium for the reaction.

After all of the reactants have been charged into the vessel, agitation is initiated and the reaction mixture is heated to a temperature of from about 60 to 150° C. and maintained at that temperature for a period of from about 6 to 10 hours. Preferred reaction conditions are from 7 to 8 hours at 75° to 85° C. The precise combination of reaction conditions will, of course, depend upon the particular epihalohydrin and benzophenone intermediate which are to be utilized. It may be noted that the reaction may also be carried out at ambient temperatures but under such conditions the reaction period is, of course, considerably longer and may require as much as several days to complete. Moreover, the practitioner may, if desired, conduct the reaction in a solvent medium and, as noted earlier, the use of a large excess of the epihalohydrin may be employed for this purpose.

In all cases the desired hydroxyhalopropoxy benzophenone ether reaction products are obtained in the form of brownish colored, viscous liquids or glasses which, in the case of the liquids, usually crystallize to form yellow solids at room temperature. If desired, any excess epihalohydrin which is present in the reaction product may be removed by repeated extractions with portions of very dilute, hot sulfuric acid. By means of the process of our invention, our novel benzophenone derivatives are produced in yields of about 92 to 98% of the theoretical and, as noted earlier, do not require any purification prior to their ultimate use. However, if desired, such further purification may be accomplished by recrystallizing the initial reaction products from a methanol-water mixture.

In utilizing the novel products of our invention, they may be combined with a wide variety of synthetic organic polymers so as to provide the latter with resistance to the degradative effects of ultra-violet radiation. Thus, they may be admixed, for example with any of the homo- or copolymers derived from such ethylenically unsaturated monomers as styrene; alpha-methyl styrene the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; acrylic acid, isoprene; butadiene; methacrylic acid; acrylamide; acrylonitrile; methacrylonitrile; vinyl propionate; dibutyl maleate; dibutyl fumarate; vinylidene chloride; vinyl chloride; vinyl acetate; ethylene; and propylene, etc.

In order to protect the latter polymers from ultra-violet radiation, our novel derivatives should be introduced in a concentration of about 0.1 to 10.0%, by weight, of the polymer. The actual blending should ordinarily occur prior to the ultimate molding, extrusion, casting, calendering or other type of forming operation to which the polymer may be subjected.

It may be noted that in addition to being blended with homo- and copolymers, the derivatives of our invention may also be used for the light stabilization of the unsaturated polyester resins resulting from the condensation of a polyhydric alcohol such as glycerol, ethylene glycol, pentaerythritol or diethylene glycol, etc., with a blend of a saturated polycarboxylic acid, such as phthalic or adipic acids, etc., and an alpha, beta- ethylenically unsaturated polycarboxylic acid, such as maleic, fumaric, or itaconic acids or any of their anhydrides. These polyester resins are ordinarily reacted subsequent to their initial preparation, with an ethylenically unsaturated, i.e., vinyl type monomer, particularly either styrene or methyl methacrylate, which is added to the polyester immediately prior to its ultimate forming or curing which takes place under the influence of heat and/or in the presence of a free radical initiating catalyst and which thereby results in the formation of a rigid, crosslinked product.

In practice, the derivatives of our invention are physically blended with the polyester resin at the same time as the crosslinking vinyl monomer is introduced, i.e., immediately prior to the final forming operation and this blending is accomplished by dissolving the derivative in the vinyl monomer which, in addition to reacting with the polyester, also serves as a solvent for the latter. By means of this procedure, our derivatives are uniformly dispersed throughout the polyester resin. For protecting such polyester resins against ultra-violet degradation, it is advisable to employ about 0.1 to 10.0%, by weight of the polyester resin, of one of our novel benzophenone ethers.

Similar protection against ultra-violet degradation may also be provided to various other resinous materials, such as spar varnishes, alkyd resins, polyurethanes, and polycarbonates, by blending any of the latter with one of our novel derivatives in a manner comparable to that described above for the stabilization of unsaturated polyesters.

In addition to their being physically blended with various resins in applications which take direct advantage of their ultra-violet absorbing ability, the derivatives of our invention are further characterized by their versatility as chemical intermediates. The latter property, which is rather unusual among light stabilizing benzophenone derivatives, is dependent upon their possessing hydroxyhalopropoxy groups. The presence of these groups thereby permits these novel benzophenone ethers to be readily reacted with a wide variety of organic and inorganic reagents as well as with many polymeric materials.

Thus, for example, our novel derivatives may be reacted, through their halogen atoms, with an alkali metal or silver salt of a carboxylic acid so as to provide ester derivatives of any desired chain length. If, on the other hand, one reacts our derivatives with the salt of an ethylenically unsaturated carboxylic acid such as acrylic or methacrylic acid, the resulting reaction product will be a vinyl type monomer. By reacting our derivatives with suitable alkoxy intermediates in a typical Williamson synthesis, one may prepare ether derivatives of varying chain lengths. Quaternization of their halogen atoms with amines provides the quaternary ammonium halide derivatives of our novel compounds. And, as a final example of the versatility of these interesting intermediates, one may note that hydrolysis of their halogen atoms yields their primary alcohol derivatives.

The following examples will further illustrate the embodiment of our invention. In these examples, all parts given are by weight unless otherwise noted.

Example I

This example illustrates the preparation of 2-hydroxy-4-(2-hydroxy-3-chloropropoxy)benzophenone, i.e.

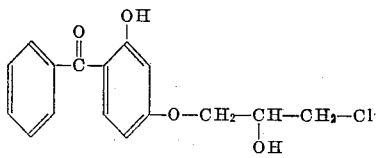

by means of the process of our invention.

The following ingredients were charged into a reaction vessel equipped with means for mechanical agitation:

| | Parts |
|---|---|
| 2,4-dihydroxybenzophenone | 42.4 |
| Epichlorohydrin | 20.4 |
| Tetramethylammonium chloride | 1.37 |

The above described mixture was then heated, under agitation, for a period of 8 hours at a temperature of 80° C. The resulting reaction product, which was in the form of a brownish, viscous liquid which solidified on standing at room temperature, was recrystallized from a methanol-water mixture thereupon yielding 45.0 parts of 2 - hydroxy - 4 - (2 - hydroxy - 3 - chloropropoxy)benzophenone having a melting point of 50°–53° C. Further analysis revealed an actual chlorine content of 11.2%, by weight, as opposed to a theoretical chlorine content of 11.6%.

In a repetition of the above procedure, 2,2′,4-trihydroxybenzophenone was, in this case, substituted for 2,4-dihydroxybenzophenone thereby resulting in the preparation of an equivalent amount of 2,2′-dihydroxy-4-(2-hydroxy-3-chloropropoxy)benzophenone.

Example II

This example illustrates the preparation of 2,2′,4′-trihydroxy-4-(2-hydroxy-3-chloropropoxy)benzophenone, i.e.

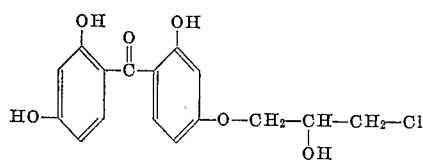

by means of the process of our invention.

The following ingredients were charged into a reaction vessel equipped with means for mechanical agitation:

| | Parts |
|---|---|
| 2,2′,4,4′-tetrahydroxybenzophenone | 49.2 |
| Epichlorohydrin | 40.4 |
| Tetramethylammonium chloride | 1.4 |

The above described mixture was then heated, under agitation, for a period of 8 hours at a temperature of 130° C. The resulting reaction product, which was in the form of a yellow-brown glass, was recrystallized from a methanol-water mixture thereupon yielding 50.0 parts of 2,2′,4′-trihydroxy-4 - (2 - hydroxy - 3 - chloropropoxy) benzophenone having a melting point of 105–107° C. Further analysis revealed an actual chlorine content of 10.3%, by weight, as opposed to a theoretical chlorine content of 10.5%.

Example III

This example illustrates the actual use of our novel derivatives for the protection of various polymers against the degradative effects of ultra-violet radiation.

The procedure utilized in demonstrating the effectiveness of our derivatives as light stabilizing additives involved their being dissolved in samples of various polymer lacquers. Films having a wet thickness of 3 mils were thereupon cast from these lacquers onto glass plates. After being air dried overnight, the thus coated plates were then exposed, for varying periods, at a distance of 2 feet from a mercury vapor photochemical lamp which was enclosed, together with the film, in a ventilated light proof cabinet. The relationship between outdoor sunlight and the ultra-violet radiation developed by this apparatus is such that 24 hours of exposure therein is equivalent to 30 days of outdoor exposure wherein each of said days provides 8 hours of sunlight.

As a control for these tests, comparable films were cast from samples of each of the same lacquers which, in this case, had not been formulated with any of our light stabilizing derivatives. These films were similarly exposed to the ultra-violet source and the results of these comparative tests are given in the table which is presented below wherein, for purposes of brevity, the derivatives utilized are referred to by the following designations:

Derivative #1 = 2-hydroxy-4-(2-hydroxy-3-chloroproxy)benzophenone

Derivative #2 = 2,2′,4′ - trihydroxy - 4 - (2 - hydroxy - 3-chloropropoxy)benzophenone

| Polymer lacquer | Derivative | Percent Derivative on resin solids | Exposure time (hrs.) | Condition of film |
|---|---|---|---|---|
| Polystyrene in toluene; 30%, by weight, resin solids. | | | 8 | Turned yellow. |
| Do | #1 | 0.5 | 8 | Remained colorless. |
| Do | #2 | 0.25 | 8 | Do. |
| A 75:25 vinylidene chloride: butyl acrylate copolymer in tetrahydrofuran; 25% by wt., resin solids. | | | 2 | Turned brown and became brittle. |
| Do | #1 | 1.0 | 2 | Remained colorless and flexible. |
| Do | #2 | 0.5 | 2 | Do. |
| A 90:10 vinyl chloride:vinyl acetate copolymer in tetrahydrofuran; 25% by wt., resin solids. | | | 16 | Turned brown with many dark spots. |
| Do | #1 | 1.0 | 16 | Remained colorless. |
| Do | #2 | 0.75 | 16 | Do. |

Summarizing, our invention is therefore seen to provide the practitioner with a novel class of benzophenone derivatives which are useful as ultra-violet absorbers for synthetic organic polymers. Variations may be made in proportions, procedures and materials without departing from the scope of our invention which is limited only by the following claims.

What is claimed is:

1. The 2-hydroxy - 3 - halopropyl benzophenone ethers which correspond to the following:

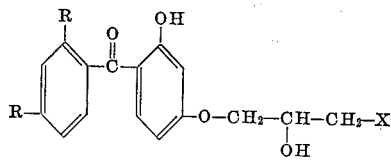

wherein X is a halogen radical from the group consisting of the chloro, iodo and bromo radicals and R is a radical independently selected from the class consisting of hydrogen and hydroxy radicals.

2. 2-hydroxy-4-(2 - hydroxy-3 - chloropropoxy)benzophenone.

3. 2-hydroxy-4-(2-hydroxy - 3 - bromopropoxy)benzophenone.

4. 2-hydroxy-4-(2 - hydroxy - 3 - iodopropoxy)benzophenone.

5. 2,2'-dihydroxy-4-(2 - hydroxy - 3 - chloropropoxy)benzophenone.

6. 2,2'-dihydroxy-4-(2 - hydroxy - 3 - bromopropoxy)benzophenone.

7. 2,2'-dihydroxy - 4 - (2 - hydroxy - 3 - iodopropoxy)benzophenone.

8. 2,2',4'-trihydroxy-4-(2-hydroxy - 3 - chloropropoxy)benzophenone.

9. 2,2',4'-trihydroxy-4-(2-hydroxy-3 - bromopropoxy)benzophenone.

10. 2,2',4'-trihydroxy-4-(2-hydroxy - 3 - iodopropoxy)benzophenone.

References Cited by the Examiner
UNITED STATES PATENTS

| | | | |
|---|---|---|---|
| 2,789,140 | 4/1957 | Von Glahn et al. | 260—591 |
| 2,853,521 | 9/1958 | Hardy et al. | 260—591 |
| 2,861,976 | 11/1958 | Gordon | 260—45.95 |
| 2,887,466 | 5/1959 | Lappin et al. | 260—45.95 |
| 2,943,096 | 6/1960 | Reinking | 260—348.6 |
| 2,976,259 | 3/1961 | Hardy et al. | 260—591 |
| 3,070,473 | 12/1962 | Henry et al. | 260—591 X |
| 3,086,988 | 4/1963 | Gordon | 260—591 X |

BERNARD HELFIN, *Primary Examiner.*

LORRAINE A. WEINBERGER, *Examiner.*

DANIEL D. HORWITZ, LEON ZITVER,
*Assistant Examiners.*